(12) United States Patent
Lackey

(10) Patent No.: US 9,287,619 B2
(45) Date of Patent: Mar. 15, 2016

(54) HIGH DEGREE OF FREEDOM ARRAY

(71) Applicant: BAE Systems Information and Electronic Systems Integration Inc., Nashua, NH (US)

(72) Inventor: Raymond J. Lackey, Bohemia, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 456 days.

(21) Appl. No.: 13/787,963

(22) Filed: Mar. 7, 2013

(65) Prior Publication Data

US 2014/0253381 A1    Sep. 11, 2014

(51) Int. Cl.
*G01S 3/16* (2006.01)
*G01S 3/28* (2006.01)
*H01Q 3/34* (2006.01)
*G01S 19/21* (2010.01)
*H01Q 21/00* (2006.01)

(52) U.S. Cl.
CPC ........ *H01Q 3/34* (2013.01); *G01S 19/21* (2013.01); *H01Q 21/00* (2013.01)

(58) Field of Classification Search
CPC ............ G01S 3/16; G01S 3/28; G01S 19/21; H01Q 3/34; H01Q 21/00

USPC ......................................................... 342/378
See application file for complete search history.

(56) References Cited

U.S. PATENT DOCUMENTS

| | | | |
|---|---|---|---|
| 4,070,675 A * | 1/1978 | Daniel et al. | 342/380 |
| 6,847,328 B1 * | 1/2005 | Libonati et al. | 343/700 MS |
| 2006/0133211 A1 * | 6/2006 | Yang | 367/154 |
| 2011/0050497 A1 * | 3/2011 | Maenpa et al. | 342/368 |
| 2012/0027111 A1 * | 2/2012 | Vook et al. | 375/267 |
| 2013/0241768 A1 * | 9/2013 | Petersen | 342/357.27 |

* cited by examiner

*Primary Examiner* — Harry Liu
(74) *Attorney, Agent, or Firm* — Daniel J. Long; Kimberly A. Peaslee

(57) ABSTRACT

An array of elements suitable for adaptive processing in an extreme jammed environment comprised of a plurality of smaller sub-arrays of element clusters that have natural orthogonal spatial modes of excitation, wherein the improvement comprises sub-arrays with spatial orthogonality of feed modes, cross-sub-array combination to maximize pre-processing sub-array spacing and diversity of relative configuration, a high-input analog nuller used on the pre-processing sub-array therein, a high-input analog nuller is used to null a dominant jamming signal, possibly exceeding normal communication signal levels, so that the sub-array processed signals could then be fed to an antenna processor with simultaneous beam steering and null steering.

19 Claims, 5 Drawing Sheets

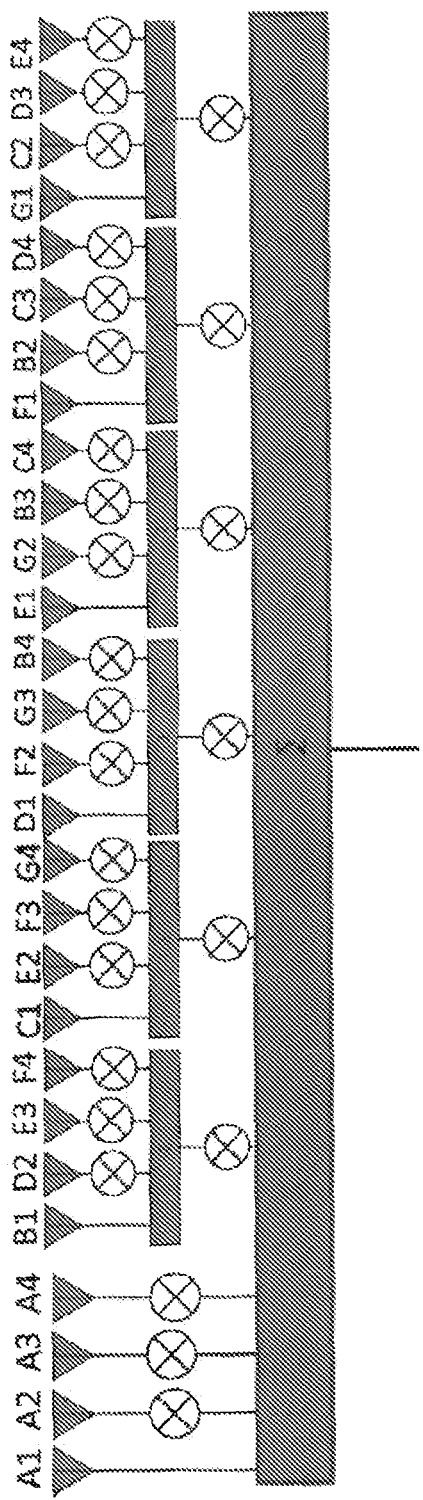

ized nulling.

HIGH DEGREE OF FREEDOM ARRAY

BACKGROUND OF THE INVENTION

1. Field of the Invention

The present invention relates to communications systems and more particularly to methods and apparatus used to prevent the jamming of communications.

2. Brief Description of Prior Developments

Current threat environments for both communication systems and navigation systems, such as GPS, are stressing current capabilities. The military laboratories are already looking at extending the dynamic range of such systems. The FAA has approved GPS guidance for commercial flight path and landing navigation. There have been cases of accidental regional jamming of GPS signals and small hand-held or vehicle-mounted GPS jammers are being used for personal privacy. It is conceivable that commercial airlines may invest in GPS AJ to answer the threat of potential terrorist acts.

SUMMARY OF INVENTION

According to the present invention, a combination of the VS-CRPA technology and typical array spacing is used to develop a very high degree of freedom array for nulling in extreme environments of large numbers, differing received power, and high received power interferers.

BRIEF DESCRIPTION OF THE DRAWINGS

The present invention is further described with reference to the accompanying drawing wherein:

FIG. 5 is a schematic drawing showing one form of a pre-processing architecture that provides orthogonalization of the interferers while maintaining spatial diversity necessary for independent spatial nulling.

DETAILED DESCRIPTION OF THE PREFERRED EMBODIMENT

This invention is a complex array designed to be used as an adaptive array for communications systems in an extreme jammed environment. This is an array of smaller sub-arrays with unique properties. Each of the smaller sub-arrays utilizes the techniques of our VS-CRPA where we are able to form sharp nulls with a small array. These small sub-arrays can be used with a high-power input analog adaptive nulling processer to null the dominant jamming signal(s) and the sub-array processed signals could then be fed to a standard antenna electronics with simultaneous beam steering and null steering. This would greatly extend the working dynamic range of a communications system in a jammed environment.

The following considerations are pertinent to this invention:

(1) In theory, an adaptive array processor can null an individual signal as tar below noise as it was initially above noise. This rarely happens because the next strongest interference signal acts like a pseudo noise floor, limiting the null depth.

(2) The nulling speed of an adaptive array processor is a function of the magnitude of the eigenvectors of the covariance matrix of the array interference scenario. The relative magnitude of the eigenvectors can be functions of received signal strength, signal bandwidth, and signal received angular spacing. Thus the array attacks the strongest eigenvectors at a rate of function of loop gain and loop time constraint. The second strongest eigenvectors with a delta magnitude of $-x$ dB is attacked at a speed as a function of (Loop Gain $-x$). Thus at a much slower rate, ie $-10$ dB relative strength, the loop convergence is approximately 10 times as great.

(3) Normally the best way of resolving a sharp null on a signal, is to use a larger aperture. The VS-CRPA demonstrated sharp milling via rapidly changing beam factor of Phase and/or amplitude rather than enlarging the array spacing.

(4) Preprocessors such as Gram-Schmidt preprocessor worked on an n-element best if all elements were similar and saw the same environment. That restriction is not true of our VS-CRPA ports.

(5) Preprocessing cannot do better than the perfect adaptive array and processor but it can allow an imperfect processor to find a better solution, than normally would be found, at a faster rate.

(6) A preprocessor should attempt to preserve as much difference between ports as possible to maximize both speed and null depth of the final processor, at the least, and a minimum of one undiminished auxiliary should still be fed to the post processor to continue reduction of the strongest eigenvectors.

Figure 1:
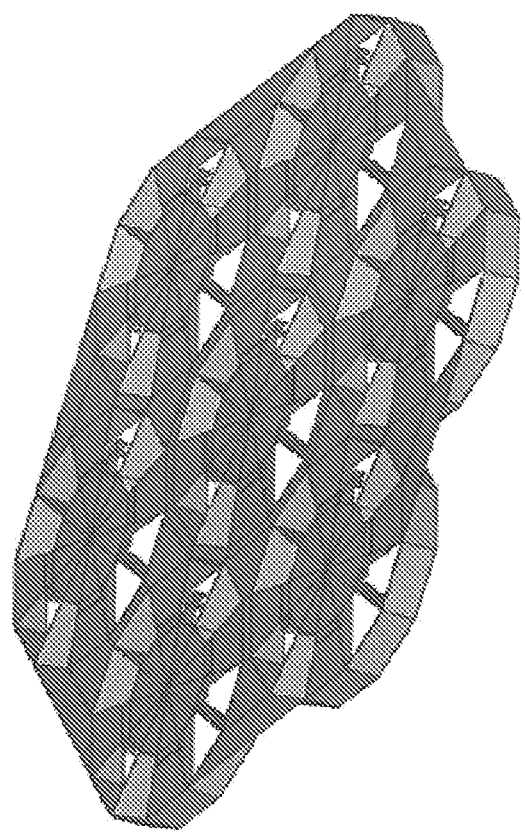
FIG. 1 is an illustration of a super array of sub-array clusters.
Figure 2:
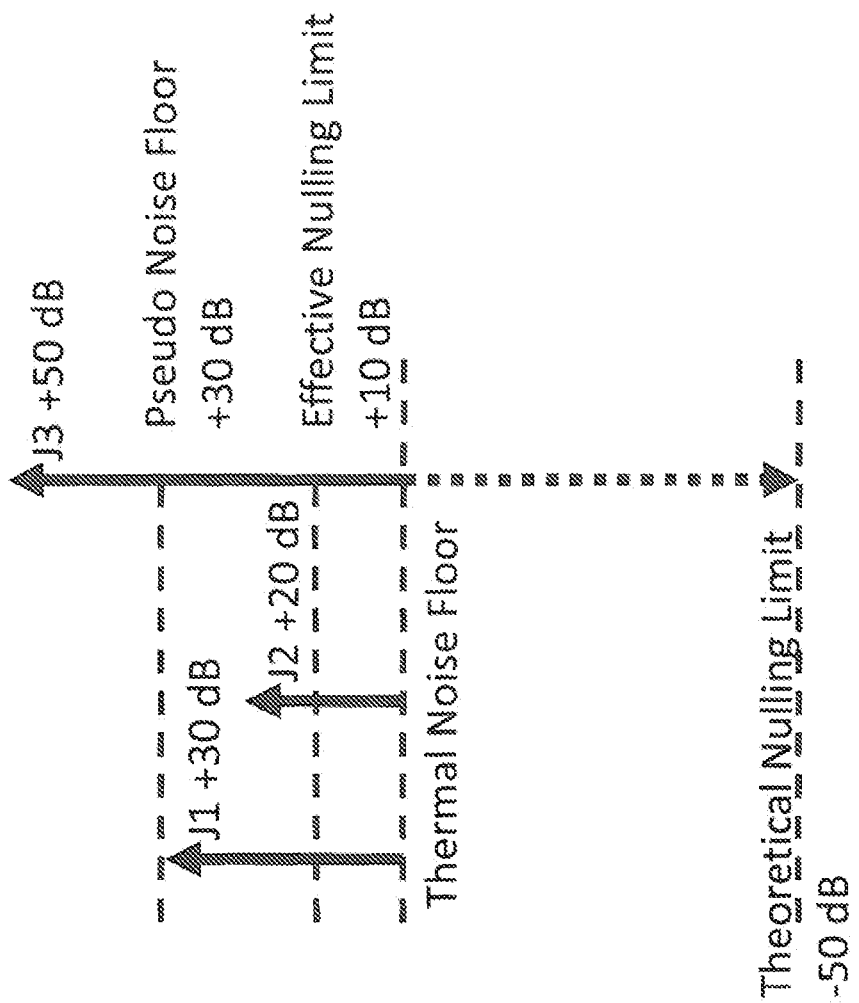
FIG. 2 is a drawing showing the difference between theoretical nulling limits and typical achieved nulling limits due to secondary jammer effects for a scenario of three independent interferers with three differing levels of received power (J1 @ 30 dB above thermal noise, J2 @20 dB above thermal noise, J3 @50 dB above thermal noise)

Considering a standard 7-element CRPA array of a center element ringed by a six auxiliary elements, a VS-CRPA is substituted for each element in the array, and a preprocessor is put on each VS-CRPA to attack the strongest eigenvectors of the covariance matrix. FIG. 1 shows an antenna structure of a central sub-array cluster surrounded by six auxiliary sub-array clusters. These sub-array clusters are composed of slot elements similar in function to the VS-CRPA elements but with conformal properties for high-performance platforms. Since each sub-array cluster essentially sees the same environment, they should all form similar patterns, principle null on the strongest signal or other manifestation of the energy impinging upon the array. The preprocessor can be standard processor architecture but could be designed to work at high power levels similar to the strongest jammer, exceeding the dynamic range required of the next level of processor. The sub array outputs can then be combined through a standard adaptive array process, having previously eliminated the strongest interferer at the sub-array level and greatly reducing the dynamic range required. Considering paragraph (1) above and FIG. 2, it will be understood that J3 dominates and, with enough degrees of freedom, sufficient integration, and sufficient integration time, it could be nulled to the theoretical nulling limit. This does not occur when these requirements are not met. With a single degree of freedom, assuming widely spaced interferer and independence in array factor for those angles, the processor nulling for J3 is limited to the effective nulling limit +10 dB above thermal noise because it has limited to the pseudo noise floor of J1. With additional degrees of freedom, sufficient for the problem, the secondary jammers can be reduced and then the nulling on J3 can be improved as the pseudo noise floor is reduced by milling of J1 and J2.

Figure 3:
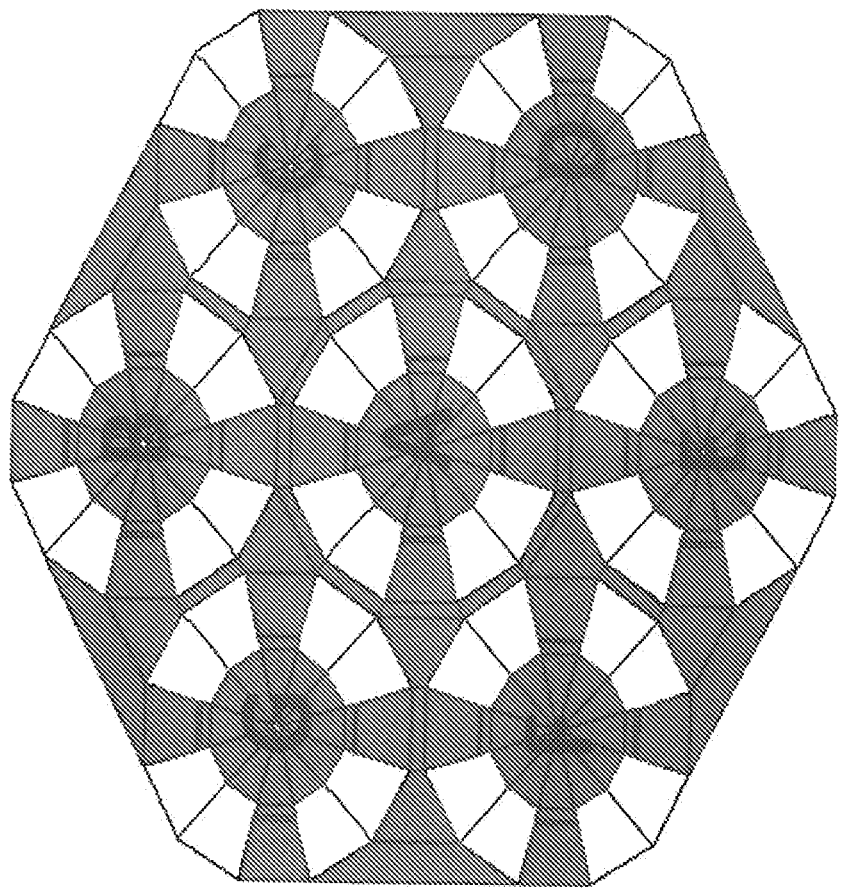
FIG. 3 is a schematic drawing showing a super-array of sub-arrays of element clusters that have natural orthogonal spatial modes of excitation having a center cluster (A) surrounded by similar clusters (B-G)
Figure 4:
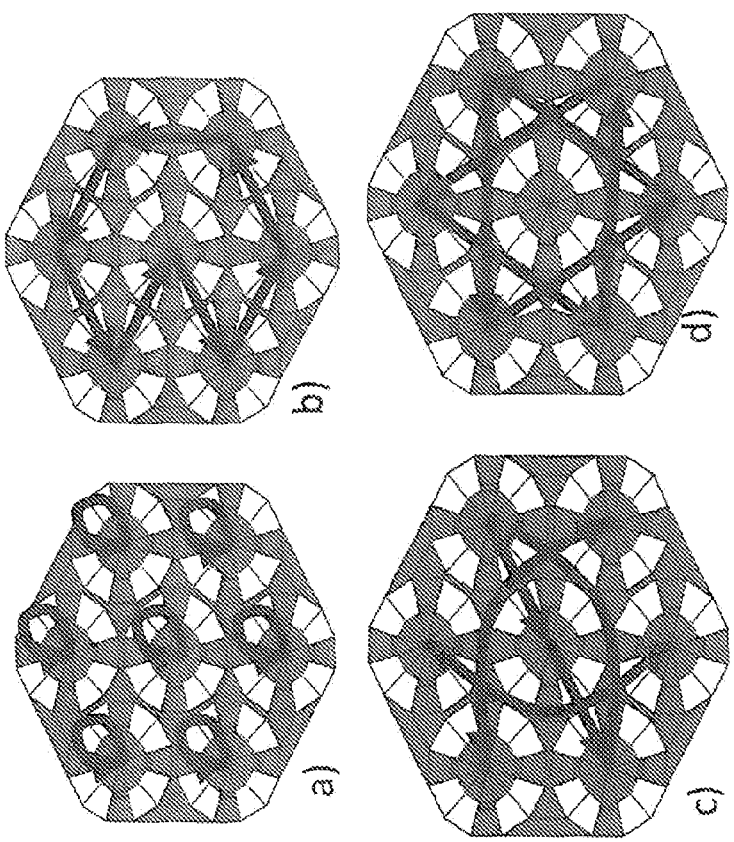
FIG. 4 is an illustration of differing methods of forming the pre-processing sub-arrays by interconnecting selected ports of the sub-array clusters, yielding differing nulling capabilities.

A high degree of freedom adaptive array may be used for adaptive antenna array nulling. In it each element in a Controlled Reception Pattern Antenna (CRPA) may be replaced with a sub-array such as the VS-CRPA-4, a 4-element cluster, this producing a 28 element array. Referring FIG. 3, the clusters provide sharp nulling by mode factor differences, but nulls could be sharpened further by utilizing different modes in different clusters with greatest spatial separation. FIG. 4a shows the pre-processing sub-array where each sub-array cluster works independently, its auxiliary excitation modes working with its own reference port excitation. This gives advantages in fabrication commonality but does not provide optimum pre-processing sub-array capability. FIG. 4b shows pre-processing sub-array configuration with neighboring interconnection so that the vector alignment between sub-array reference port and sub-array cluster auxiliary ports have the maximum diversity. FIG. 4c shows a pre-processing sub-array interconnection where the spacing of reference and auxiliaries of sub-array clusters is maximized. Thus individual ideal parings may be BE, CF and DG; however, this only provides ideal pairings for jammers relatively broadside to the pairing and not a best average or a universal ideal. FIG. 4d shows the pre-processing sub-arrays formed by a compromise of having the vector alignment diversity of 4b and maximizing pre-processing sub-array apertures of 4c, while keeping the central cluster ports independent for the next level of processing. These alternative architectures have considered sub-array duster auxiliaries as a block, although there is no constraint that forces sub-array cluster auxiliary ports to be processed as a group. Thus a grouping geared to a preprocessor, as is discussed in paragraphs (3) and (4) above, may use an alternative pairing to achieve a best average pairing.

Now considering paragraphs (4)-(6) we do not have identical elements in paragraph (4) but want to have the best possible total array performance. The sub-array duster provides very good nulling in a very small area because of its common orthogonal modes of excitation and a common phase center. The pre-processing sub-array does not have to match the sub-array cluster. The preprocessor should be structured to give the best possible first level nulling but also preserve as much difference between the individual preprocessor outputs as is further discussed in paragraph (6) above. For a sample of the strongest jammer, we need to preserve clean auxiliaries for further nulling against it. Thus, we do not want to use all auxiliary elements in the first level preprocessor. We thus needed to investigate an optimized paring of auxiliary elements. Thus, with letters indicating clusters and numbers indicating sub-array cluster excitation mode; progressive phase omni-right (PPOR) (1), progressive phase omni-left (PPOL) (2), uniform phase mini (UPO) (3) and clover leaf (CL) (4), a potential pairing is shown in FIG. 5. This pre-processing sub-array differentiation provides orthogonal auxiliaries, maximizes pre-processing sub-array spacing and provides Orientation diversity of the pre-processing sub-arrays so that the post processing has the greatest probability of being able to receive in all directions not being jammed.

An analog pre-processor sub-array thus has a local reference element input, un-weighted, and three weighted auxiliary elements, of differing modes and differing spatial relative positions from different sub-array clusters. In a scenario of a single strong jammer they would all have a null aligned with that jammer, but their spatial coverage, the way that they break out of the null, would be different due to spatial vector orientation between pre-processor reference and its auxiliary ports. They could, in theory, null three independent strong jammers but two is more reasonably.

The final antenna electronics can thus have ten inputs; 6 preprocessed sub-array ports and 4 raw modes with a phase center in common with the reference port as shown in FIG. 5. The raw modes may need to allow a high power input, with weight controlled by a simple limiting controller to keep level within power handling capability of the adaptive processor.

While the present invention has been described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. A super-array of elements suitable for a multilevel adaptive processing architecture for the nulling of multiple interferers of differing levels, wherein the interferers span a high dynamic range and have received signal strengths exceeding normal communication levels of the receiver comprising
providing a super array comprised of a plurality of sub-arrays, wherein the plurality of sub-arrays are spaced electrically close (≤Lamda spacing) to facilitate coherent processing in the super-array.

2. The super-array of claim 1, wherein the plurality of sub-arrays have natural orthogonal spatial modes of excitation.

3. The super-array of claim 2, wherein the sub-array is composed of four elements in a square configuration.

4. The super-array of claim 2, wherein the sub-array is composed of eight elements in an octagon configuration.

5. The super-array of claim 2, wherein the sub-array is composed of elements projecting above the skin of a platform.

6. The super-array of claim 2, wherein the sub-array is composed of patch elements so that the array can be low profile and nearly conformal to the skin of an aircraft.

7. The super-array of claim 2, wherein the sub-array is composed of slot elements so that the array can be conformal to the skin of an aircraft.

8. An architecture for facilitating rapid and deep nulling comprising,
pre-processing a plurality of sub-arrays, wherein the plurality of sub-arrays are spaced electrically close (≤Lamda spacing) to facilitate coherent processing in the super-array; and
post-processing to isolate eigenvalues of highly differing levels.

9. The architecture of claim 8, wherein pre-processing the plurality of sub-arrays is restricted to the sub-array cluster thereby maximizing the benefits of common phase center and fabrication efficiencies.

10. The architecture of claim 8, wherein pre-processing the plurality of sub-arrays is not restricted to the sub-array cluster thereby maximizing the benefits of maximum inter-element array spacing.

11. The architecture of claim 8, wherein pre-processing the plurality of sub-arrays is not restricted to the sub-array cluster thereby maximizing the benefits of non-uniform array orientations.

12. The architecture of claim 8, wherein pre-processing the plurality of sub-arrays is designed to handle very high received power signals exceeding normal communication levels.

13. The architecture of claim 8, wherein pre-processing the plurality of sub-arrays uses analog processing to handle the greatest possible dynamic ranges.

14. The architecture of claim 8, wherein pre-processing the plurality of sub-arrays uses digital processing to obtain best possible nulling at that level.

15. The architecture of claim 8, wherein the post-processing performs adaptive null steering.

16. The architecture of claim 8, wherein the post-processing performs adaptive beam steering.

17. The architecture of claim 8, wherein the post-processing performs simultaneous adaptive null steering and beam steering.

18. The architecture of claim 8, wherein the post-processing uses analog processing to handle the greatest possible dynamic ranges.

19. The architecture of claim 8, wherein the post-processing uses digital processing to obtain best possible nulling at that level.

\* \* \* \* \*